United States Patent Office 2,873,227
Patented Feb. 10, 1959

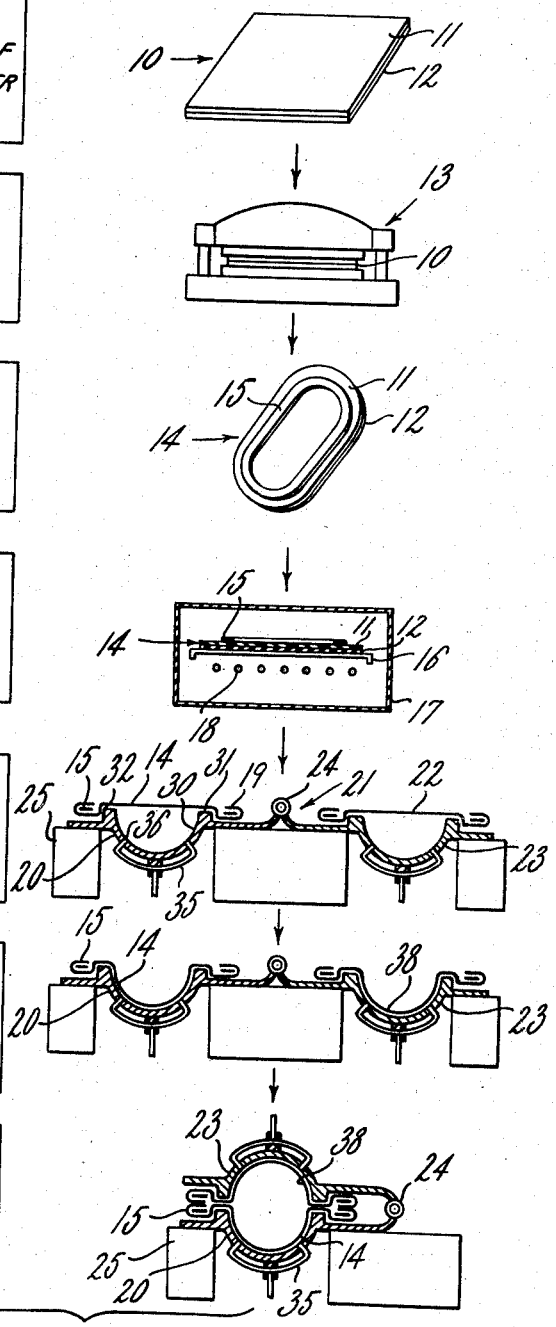

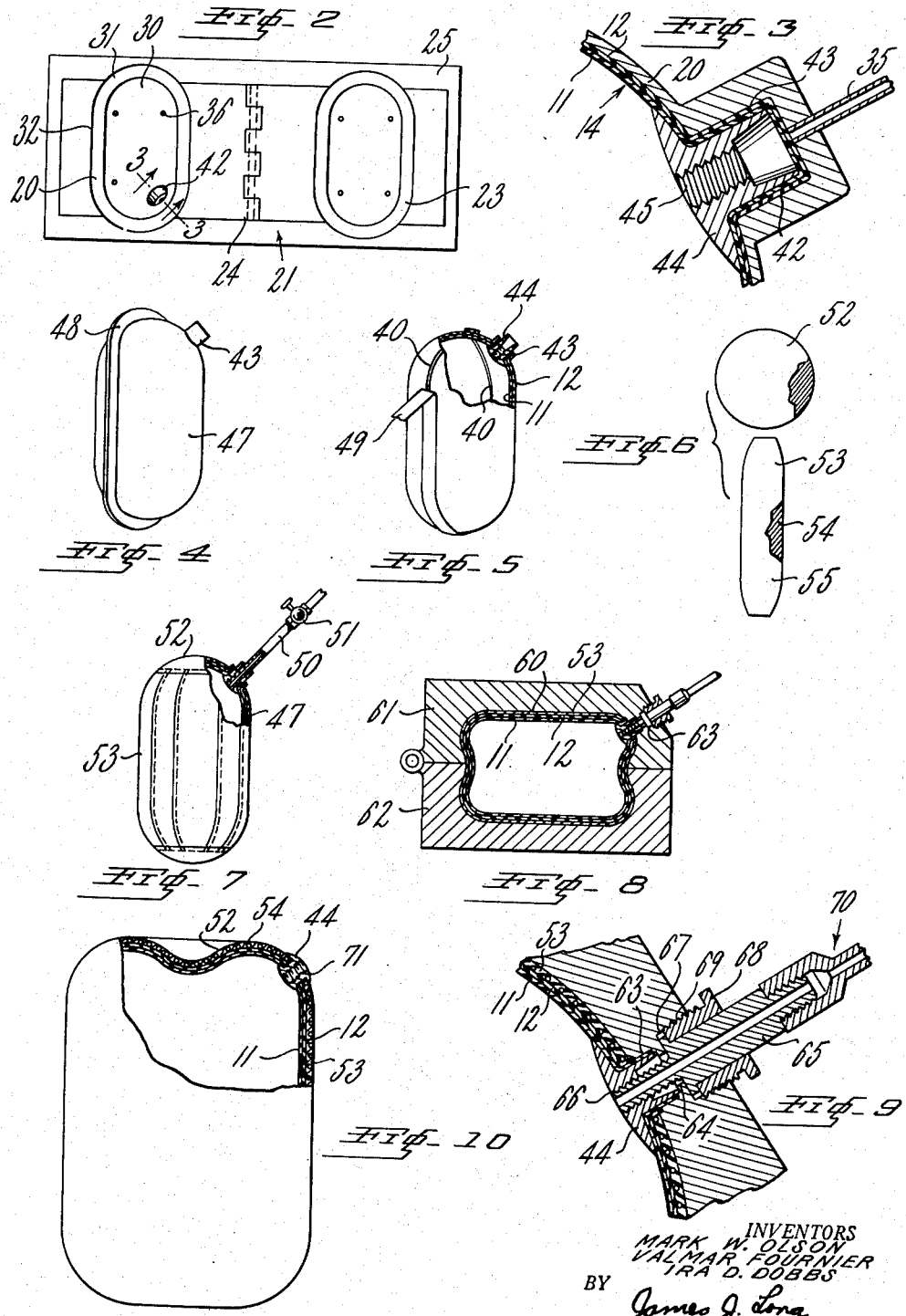

2,873,227

METHOD OF MAKING RESIN-LINED RUBBER CONTAINERS

Mark W. Olson, Allendale, Valmar Fournier, Wallington, and Ira D. Dobbs, Allendale, N. J., assignors to United States Rubber Company, New York, N. Y., a corporation of New Jersey Application March 21, 1955, Serial No. 495,648

6 Claims. (Cl. 154—83)

This invention relates to a method of making rubber containers, and more particularly it relates to a method of making flexible, collapsible rubber drums or barrels of the general kind disclosed in U. S. Patent 2,612,924 of Marion M. Cunningham.

Containers of the foregoing kind are useful for shipping or storing liquid or particulate chemicals or other commodities, and they are typically made essentially of rubber reinforced with a relatively inextensible, flexible material such as textile cord.

One object of the invention is to provide an improved method of manufacturing such containers, which does not require assembling the container over a separate building form, whether permanent or destructible.

Another object of the invention is the provision of an improved method of incorporating a chemically resistant liner in such a container.

Still a further object is to provide a method of assembling an essentially chemically inert liner of polyethylene in a container comprising a Butyl rubber composition.

Additional objects and advantages of the invention will be made manifest in the following detailed description, which is intended to be read with reference to the accompanying drawings, wherein Fig. 1 is a diagrammatic flow sheet representing certain steps in one method of carrying out the invention;

Fig. 2 is a plan view of a hinged two-part mold assembly useful in shaping portions of the inner assembly of the container;

Fig. 3 is an enlarged fragmentary sectional view of a portion of the mold of Fig. 2 intended to receive a container inlet means, taken along the line 3—3 of Fig. 2, with a container inner assembly and connecting means in place in the mold;

Fig. 4 is a side elevational view of the container inner assembly as removed from the mold;

Fig. 5 is a similar view, with a portion of the container broken away, in a subsequent stage of the process;

Fig. 6 is a plan view of rubberized cord fabric pieces cut out for application to the inner container assembly;

Fig. 7 is a view similar to Fig. 5, with the outer rubberized fabric pieces applied to the inner assembly and an air pressure supply line connected to the container;

Fig. 8 is a sectional view of the container enclosed in a vulcanizing mold;

Fig. 9 is an enlarged view of a portion of Fig. 8, showing in more detail a connecting means for applying pressure within the container; and, Fig. 10 is an enlarged view of the container after removal from the vulcanizing mold, shown with a portion broken away.

A typical form of the invention contemplates the construction of a rubber container in which the entire inner surface or lining is made of relatively inert resinous, plastic material, thereby separating the contents of the container from contact with the rubber body of the container. In this way the contents are preserved from contamination by their action on the rubber, or from picking up any objectionable odor or taste from the rubber. A particularly suitable resin for this purpose is polyethylene.

The invention further contemplates initially fabricating an inner assembly including the polyethylene or other resinous lining, and employing this inner assembly as a building form on which the principal strength-imparting layers of textile-reinforced rubber are superimposed and adhesively united to make the complete container wall. In this way, the initial inner assembly including the plastic layer serves, in effect, as a building form that ultimately becomes an integral part of the container.

In accordance with the invention the initial inner assembly is made up of a preformed laminate of the polyethylene or other resinous plastic lining material with an outer layer of rubber, which is preferably the same kind of rubber as employed in the strength-imparting outer reinforced rubber layer or layers of the container. The arrangement is therefore such that the rubber layer disposed on the outside of the plastic lining in the initial inner assembly is eventually in the finished container sandwiched in between the plastic lining and an outer rubberized fabric body, and such rubber layer serves as an intermediate transitional bonding layer between the plastic and the outer rubberized fabric body. The rubber portions of the container are advantageously based on Butyl rubber compositions because Butyl rubber is susceptible in accordance with the method of the invention of being firmly bonded to the polyethylene plastic layer, and Butyl rubber is outstandingly resistant to deterioration on aging and has other desirable characteristics. As is well known to those skilled in the art, Butyl rubber is a type of synthetic rubber made by low-temperature copolymerization of an isoolefin such as isobutylene with a small amount of a conjugated diolefin such as isoprene, and it is characterized by an unusually low degree of chemical unsaturation.

The initial preformed laminate, typically of polyethylene and Butyl rubber, may be made by taking two preformed sheets, one of polyethylene and the other of the Butyl rubber composition, and laminating such sheets together under heat and pressure, as with the aid of a heated press or pinch rolls or a calendar, so that they become at least temporarily attached to each other. Alternatively, the Butyl rubber composition may be formed into a sheet and the polyethylene may then be deposited thereon as a surface layer by calendering or skim coating, or, conversely, the polyethylene may be formed as a sheet and the Butyl rubber subsequently calendered thereon as a surface layer.

For purposes of the invention the Butyl rubber composition employed is one which is compounded for vulcanization, and in the typical practice of the invention we employ a composition based on reclaimed Butyl rubber (or pre-cured and refined Butyl rubber, or less preferably Butyl rubber that has been chemically modified (i. e., partially pre-cured) by reaction with small amounts of a curative such as dinitrosobenzene or a 2,6-dimethylol-4-alkyl phenol resin) in order to obtain good adhesion of the Butyl rubber to the polyethylene. Butyl rubber reclaim suitable for the present purpose is obtainable from commercial sources, but it may also if desired be simulated by pre-curing and then refining ordinary raw Butyl rubber, or the reclaim may even be approximated by partially pre-curing the virgin Butyl rubber with any suitable known vulcanizing agent to an appropriate limited extent, as indicated. The term "Butyl rubber reclaim" as used herein contemplates any such forms of Butyl rubber.

A layer of reclaimed Butyl rubber composition may be applied to the polyethylene, followed by a layer of a different Butyl rubber composition superimposed on the Butyl reclaim, in which case the intermediate layer of Butyl serves as a "tie gum" to aid in uniting the polyethylene to the Butyl rubber layer.

The following is a preferred vulcanizable Butyl rubber composition for use in the invention:

| | Parts by weight |
|---|---|
| Butyl reclaim | 200 |
| Zinc oxide | 5 |
| Stearic acid | 1 |
| Zinc stearate | 2 |
| Lithopone | 60 |
| Mercaptobenzothiazole | 0.5 |
| Tetramethylthiuramdisulfide | 0.5 |
| Sulfur | 0.75 |
| Amberol ST–137 (commercial resol resin believed to be a self-condensation product of 2,6-dimethylol-4-octyl phenol) | 5 |
| Paraffin oil | 10 |

The Amberol ST–137 serves as a tackifying agent.

Although Butyl rubber has shown itself to be the preferred elastomer for both the outer layer of the laminated liner assembly and the outer covering of the container, because of the greater strength of the bond formed with polyethylene, serviceable containers can be made when other elastomers than Butyl are used in the outer covering. To secure an especially strong bond between the polyethylene layer and the Butyl rubber layer, polyethylene may be sprinkled or dusted on to the Butyl rubber layer prior to laminating operation, in accordance with the disclosure of copending application Serial No. 312,916 of Mark W. Olson, filed October 3, 1952, now U. S. Patent No. 2,711,985.

The adhesive union of the polyethylene layer and the vulcanizable Butyl rubber layer becomes strong and permanent when the laminate is subjected to vulcanizing conditions to cure the Butyl rubber at a temperature in excess of the melting point of the polyethylene. A vulcanizing temperature of at least about 260° F. must be employed, to definitely fuse the polyethylene, otherwise satisfactory adhesion is not obtained. As long as the minimum temperature necessary to fuse the polyethylene to the Butyl rubber is equaled or exceeded during the vulcanization, it does not matter how high the vulcanizing temperature is, short of course of a temperature high enough to cause thermal injury to the Butyl rubber. In ordinary practice, temperatures greatly in excess of about 360° F. will not generally be employed.

When employing the preferred compositions based on Butyl rubber reclaim, it will be found that optimum physical properties and good adhesion to the polyethylene may be obtained at the same time. However, if the composition is based on virgin Butyl rubber, it will be found that a better bond is obtained if the vulcanizing conditions are such as to provide either an under-cure of the Butyl rubber, or an over-cure (reversion) of the Butyl rubber, as distinguished from the "normal" state of cure usually associated with optimum physical properties. An advantage of employing Butyl rubber reclaim as described is that good physical properties are obtained along with good adhesion, whereas with virgin Butyl rubber the best adhesion is obtained only with a state of cure (under-cure or over-cure) that is not desirable in the finished container because it does not represent the best physical properties. Those skilled in the art of vulcanizing rubber will be able without difficulty to so formulate the vulcanizable composition and to so regulate the vulcanizing conditions as to produce a desired state of cure, care being taken to employ a vulcanizing temperature sufficiently high to fuse the polyethylene, as indicated. The vulcanization of the polyethylene-Butyl rubber laminate may be carried out in a suitable mold or press, in which the polyethylene layer is maintained in firm pressurized contact with the Butyl rubber layer during the cure. The result of this operation is a typically flat two-layered laminate comprising a plastic layer firmly and permanently bonded to a cured rubber layer.

In a subsequent step the foregoing laminate is shaped with the aid of heat and a suitable forming mold into a suitably curved shape representing a portion of the container. Most appropriately the pre-cured laminate is in this operation given a shape corresponding to one-half of the container, preferably a half of the container as split along a longitudinal plane. The temperature of the assembly in this operation is in excess of the softening temperature of the plastic, that is, the resin is in a sufficiently plastic condition to flow or draw readily and conform to the shape that it is desired to impart. The vulcanized rubber layer, being relatively thin and being so compounded as to be of a relatively soft and flexible nature, stretches as necessary to conform to the desired shape. At the same time, the vulcanized rubber layer serves to keep the heat-softened plastic layer from rupturing during the shaping operation. Even though the plastic is in a softened condition in which it has virtually no strength, it can be shaped radically without tearing or other injury because it is firmly adhered to the vulcanized rubber layer.

Two halves of the container inner assembly formed in this way are then brought together with their respective edges in butting face-to-face relationship, with the plastic layer on the inside of the assembly. The parts are so arranged that the plastic layers on the inside of each half are pressed against each other at the contacting edges of the halves, and while the halves are so held firmly together the plastic layers are adhered to or merged with each other under the influence of elevated temperature, that is, the plastic layers are heat sealed or heat welded together at the edges of the halves. The two halves thus become an integral whole with a firmly welded longitudinal seam of plastic at their adjacent faces, the plastic also forming a continuous lining over the entire inner surface of the container assembly. The parts are held in this position until the assembly is cooled below the softening temperature of the plastic, after which the assembly is a strong unit and definitely set in the desired form. The polyethylene or other plastic is self-sustaining and sufficiently rigid to sustain and maintain the previously vulcanized rubber layer also in the same shape as the polyethylene layer.

To complete the container assembly there remains only to provide fittings and reinforce the seams as desired and apply as many additional layers of rubberized fabric as desired to give the necessary wall thickness and strength to the container. In connection with such operations the inner container assembly prepared as described is suitably inflated with a fluid, conveniently air, under pressure, thereby rendering the assembly more rigid and more positively form-sustaining. In this state the inner assembly constitutes in effect a firm, rigid building form on which the outer body of the container may be built. To the outside of the inflated assembly there are then applied one or more layers of the outer rubberized fabric covering, which is preferably made of cord fabric skim coated on each side with a vulcanizable rubber composition such as Butyl rubber, or fabric frictioned or otherwise coated at least on one side with a vulcanizable rubber composition or impregnated with such a composition. To apply the outer layers, pieces of the rubberized fabric are conveniently cut into suitable shapes and pressed firmly into contact with the outer surface of the pre-assembly, the contacting surfaces being provided with a suitable cement to promote adhesion. After the desired number of layers have been applied, the entire assembly is placed in a cavity of an enclosing vulcanizing mold having the shape desired in the final container, and the whole assembly is vulcanized by heat while applying substantial internal fluid pressure within the container.

In more detail, and referring to Fig. 1 of the drawings, a flat laminated sheet 10 is first prepared, made up of a layer 11 of polyethylene and a layer 12 of vulcanizable Butyl rubber stock. This laminate is subjected to heat and pressure between the platens of a suitable vulcanizable press 13 to cure the Butyl rubber layer at a temperature in excess of the fusion temperature of the polyethylene, and in the course of this operation the adhesion between the polyethylene layer and the Butyl rubber layer becomes permanent.

The laminate is then cut or stamped out in the form of a generally oval piece 14 in a size somewhat larger than one-half of the container, allowing an excess area at the peripheral edges, and a rigid oval supporting or retaining ring 15 having a diameter somewhat less than the cut piece is placed on top of the polyethylene layer 11 of the laminate. The supporting ring is suitably made of metal, such as iron, aluminum, etc. The laminate, bearing the ring 15, is then placed on a shelf 16 of an oven 17 provided with heating coils 18 to heat the laminate and ring to a temperature sufficiently elevated (e. g. 250–375° F.) to soften the laminate to a condition in which it is readily shaped as desired. At such temperatures the polyethylene becomes adhered to the ring sufficiently for the ring to serve as a support and handling means so that the laminate can be picked up and otherwise manipulated without distortion even though it is at such an elevated temperature that it is soft and extremely plastic.

In the next step (step 5 in Fig. 1) the assembly of hot laminate 14 and supporting ring 15, conveniently with the peripheral edge area 19 of the laminate folded over the ring, is placed on the upper surface of one half 20 of a hinged mold assembly 21. A like assembly 22 of heated laminate and supporting ring is similarly placed on a symmetrical second cooperating half 23 of the mold, the two halves being joined together at their adjacent longitudinal edges by a hinge 24 (see also Fig. 2). The mold assembly rests on a suitable supporting assembly 25. Each mold half contains a concave generally oval cavity 30 having a size and shape corresponding to the desired size and shape of one-half of the container inner assembly. A flat peripheral edge area 31 of the mold half represents a parting face of the mold located essentially in the mid-plane of the container. The mold body is recessed or depressed at the outer edge 32 of the parting face, and the inner diameter of the supporting ring 15 is slightly greater than the diameter of the mold body at such edge 32 by an amount approximately equal to the thickness of the laminate. The arrangement is such that when the heat-softened laminate is placed on the mold half, the supporting ring 15 fits down around the outer edge 32 of the mold parting face 31, with the laminate confined between the inner edge of the ring and the outer mold edge to form a kind of sealing or clamping arrangement in such manner that the laminate is firmly supported in a smooth, taut condition across the open upper face of the mold cavity.

For the purpose of drawing the hot laminate into conformity with the surface of the mold cavity, a system of interconnecting tubes 35 is provided opening into each mold cavity at a plurality of openings 36 and connected to a source (not shown) of vacuum, so that the mold cavities can be evacuated. As a result of such evacuation of the mold cavity, the soft, plastic laminate is drawn into contact with the wall of the mold cavity (as shown in step 6 of Fig. 1). The fact that the rubber layer of the laminate has previously been vulcanized does not interfere with this operation since the rubber is soft and stretchable, even though not plastic in the sense that the heated polyethylene layer is when at an elevated temperature. The rubber layer is sufficiently strong and sufficiently firmly united to the polyethylene layer to keep the polyethylene layer from rupturing during this drawing operation. The thus-drawn laminate represents one shaped half of the initial container assembly.

In a subsequent step the second mold half 23 (also containing a similarly drawn laminate 38) is folded over the first mold half 20, while the laminates are still hot and plastic, in such manner that opposing edge faces of the laminate are pressed together firmly between the parting faces of the mold halves (step 7, Fig. 1). The areas of each shaped laminate that are thus brought into pressurized contact are composed of the polyethylene resin, it being understood that the laminates were each placed on their respective mold halves with the polyethylene layer facing upwardly so that the polyethylene layer becomes the inner surface of the container, while the Butyl rubber layer is in contact with the mold and thus becomes the outer layer of the assembly. Under the influence of the residual heat in the laminates the contacting polyethylene surfaces at the butted edges of the assembly flow together and become a firmly welded permanent seam 40 (Fig. 5) extending entirely around the major diameter of the container in an axial mid-plane representing the parting plane of the mold assembly.

In order to provide for a bung for filling and emptying the container, one of the mold halves (20) is provided toward one end with an outwardly extending cylindrical recess or pocket 42 (Figs. 2 and 3). One of the evacuating tubes 35 is connected in this pocket to insure the laminate being drawn into the pocket to form an outwardly extending cylindrical projection 43 of the container assembly during the drawing operation previously described. Subsequent to such drawing, and previous to bringing the two mold halves together as described, a suitable fitting member 44 in the form of a flanged sleeve, adapted to receive a closure cap, is pressed snugly into the interior of the thus-formed container projection 43. The fitting 44 may be made of any suitable material such as metal or plastic, and may be provided beforehand with a threaded passageway 45 extending through the fitting, or such passageway may be drilled and threaded subsequently. The fitting may be made of polyethylene and it may be inserted hot so that it becomes firmly welded to the polyethylene lining.

The assembly is allowed to cool within the closed mold until the temperature of the plastic lining is reduced sufficiently to render it definitely form sustaining, whereupon the mold may be opened and the assembly removed. The plastic layer when cooled is also sufficiently strong and stable to resist any tendency of the previously vulcanized Butyl rubber layer, because of its elastic nature, to return to the shape in which it was vulcanized, i. e., the shape of a flat sheet. At this stage the assembly has the general appearance shown in Fig. 4, wherein the resulting container assembly 47 is seen to have a generally oval shape longitudinally, and there is still attached thereto a circumferential radially outwardly extending flange or rind portion 48 representing the excess portions of the laminate that overhung the mold cavities and within which the rigid rings used to manipulate the laminate were attached. In Fig. 4 the bung projection 43 is also seen to extend upwardly and outwardly at the upper shoulder of the assembly.

As a less preferred alternative to performing the described series of steps in the foregoing order, the laminates may be placed in an unheated condition on the mold halves with the rigid supporting rings put in place and the assembly may then be heated in a suitable chamber or oven or subjected to radiant heating devices, after which the laminates may be drawn into the mold by vacuum, either before or after removing the assembly from the heating zone.

The flash or rind 48 is then cut off the container inner assembly 47 flush with the surface thereof, thus exposing the welded polyethylene seam 40. The polyethylene seam extends to the outside of the assembly because of the manner in which the assembly was formed with portions of each laminate extending across the parting faces of the mold halves, as will be best appreciated by inspection of steps 5–7 in Fig. 1. As indicated in Fig. 5, the seam 40 is also perceptible as an inward ridge or bulge on the inside (polyethylene) surface of the container lining, because of the fact that some of the polyethylene plastic was displaced inwardly at the interface when the mold halves were pressed together at elevated temperature. The extra thickness represented by this ridge adds to the strength of the weld. The outer portion of the bung protection 43 is also cut off to give access to the outer end of the fitting 44.

To reinforce the seam on the outside (Butyl rubber) surface of the assembly a tape or strip 49 of cured Butyl rubber, coated with a suitable adhesive, is wrapped around the laminate of the liner at the juncture 40 and firmly pressed into place. There is thus made a flexible, pressure-tight laminated liner having a shape of the container of which it will form a part.

A pipe nipple 50 (Fig. 7) bearing a suitable valve 51, is threaded into the bung fitting 44, and this assembly is connected temporarily to a source (not shown) of compressed air to apply sufficient internal pressure within the container to make it hard and rigid and capable of resisting the substantial forces involved in subsequently applying an outer rubberized fabric covering to the container. A relatively low internal pressure is sufficient for this purpose. The valve 51 is then closed and the connection to the source of compressed air may be disengaged. The rubberized outer covering is prepared in the form of suitable shaped cut pieces 52, 53 of rubberized fabric comprising in this case bias-cut tire cord fabric 54 skim coated on each side with a layer 55 of vulcanizable Butyl rubber stock. Two pieces 52 of circular form serve for covering the ends of the container, while a number of elongated pieces 53 having a greater width at their mid-section and a gradually decreased thickness toward each end serve to cover the sides of the container. The side pieces may be described as truncated lunes, having generally convex longitudinal sides. One of the two circular end pieces is centrally positioned on each end of the moderately pressurized liner. The longitudinal side pieces are individually placed on the liner, so that their ends slightly overlap the two circular end pieces and also overlap one another longitudinally, and are pressed into place until the entire liner surfaces are at least covered by one layer of the outer covering.

To insure a good final bond and to give the pressurized liner assembly the required building tack, it is coated with a suitable rubber cement before applying the segmented pieces. The outer covering is not limited to one layer, but may be built up of successive layers or plies of the foregoing described pieces laid and pressed into place until the desired thickness is attained. A superior covering is built by plies cut on the bias from corded material and laid in place in such manner that they reinforce subjacent layers and thereby produce a very strong covering.

The thus-assembled container is now ready for vulcanizing or curing in the finally desired shape, as shown in Fig. 8. For this purpose the air pressure is released from the container by opening the valve 51 and the valve and nipple 50 are removed. The container is disposed within a mold cavity 60 of the desired shape defined between upper and lower separable mold halves 61, 62. The upper mold half has a suitable opening 63, into the interior portion of which the container fitting 44 is adapted to extend. At an intermediate location within the opening 63 such opening is restricted by a projecting lip or flange 64 (see Fig. 9). To make a connection between the interior of the container and an outside source of pressure, a pipe nipple 65 having a reduced threaded inner end 66 is threaded into the fitting 44 in such manner as to draw the fitting into the opening 63 toward the inner face of the mid-projection 64. A flange 67 at the inner end of the enlarged portion of the nipple is maintained in place against the outer surface of the mid-projection by a bushing 68, the inner end of which bears against such flange. The bushing has an external thread 69 adapted to be screwed into an internal thread in the outer portion of the mold opening to maintain the assembly tightly in place on the mold. An air pressure supply tube 70 is threaded onto the outer end of the nipple, and the uncured container is pressurized with the aid of this assembly to a high pressure to insure firm contact between the container and the mold. The mold prevents the outer Butyl layer from blowing out, which in turn prevents the laminated Butyl layer of the liner from being damaged; and the Butyl layer of the liner in turn prevents any impairment of the polyethylene by outward distortion or leakage or from trapped air in the rubber coated textile pieces. The mold is equipped with conventional heating means (not shown) for the purpose of subjecting the container to vulcanizing temperatures for a suitable period of time. After the container is thus cured in the mold, the air pressure is released, and the finished container is removed from the mold, and has the appearance shown in Fig. 10. The outer end of the fitting 44 may be swaged so as to form an outer flange 71 to aid in holding the fitting in place and to protect the edges of the container at the opening.

From the foregoing it will be apparent that the invention provides a convenient and economical method for making flexible and collapsible rubber containers lined with a resinous material. The method herein described inherently produces an air-tight container despite small imperfections. In fact, the production of lined containers according to the instant invention is believed to be far simpler than previously known methods of building unlined containers, because of the manner in which the plastic lining serves to give an initial shape that may be pressurized to provide a stable form for building the rest of the container. Since the plastic container lining is continuous and essentially one piece when welded at the seam as described, there is no question of leakage, even though there may be occasional small voids or imperfections in the superimposed fabric pieces forming the outer body of the container.

The container provided with a polyethylene lining as described is susceptible of many uses because the polyethylene is odorless and tasteless. It does not react with most of the liquids and powders of commerce. It is extremely easily cleaned. Many foodstuffs, chemicals and pharmaceuticals can be safely shipped in polyethylene-lined containers.

The method described is especially advantageous from the standpoint of providing adequate adhesion of the Butyl rubber to the polyethylene in the initial laminate by vulcanizing the Butyl rubber layer to the polyethylene layer at a temperature in excess of the fusion temperature of the polyethylene. The use of Butyl rubber reclaim in this connection is particularly effective in providing good adhesion. By laminating the polyethylene to the Butyl rubber layer before drawing the polyethylene to the desired shape, it is possible to draw the polyethylene without injury. It will be understood that it would not be possible to draw the polyethylene itself, if unsupported by the previously vulcanized rubber layer, without rupture.

Having thus described our invention, what we claim and desire to protect by Letters Patent is:

1. A method of making a firmly adhered laminate of polyethylene and rubber of a desired shape comprising the steps of first forming a laminate of said polyethylene with a layer of vulcanizable rubber, heating the laminate to a temperature in excess of the softening temperature of the polyethylene, thereafter vacuum drawing the heated laminate to the desired shape, the vulcanized rubber layer of the laminate serving to keep the polyethylene from rupturing, and maintaining the laminate in the said shape while cooling it to a form-sustaining temperature, the polyethylene layer after said cooling serving to maintain the previously vulcanized rubber layer in the said desired shape.

2. A method of making a firmly adhered laminate of polyethylene and Butyl rubber of a desired shape comprising the steps of providing a sheet of vulcanizable Butyl rubber composition, providing a sheet of polyethylene, thereafter forming a laminate of said polyethylene with a layer of vulcanizable rubber by pressing the two sheets together while subjecting the assembly to a temperature in excess of the melting temperature of the polyethylene whereby the Butyl rubber sheet becomes vulcanized and the polyethylene layer adheres firmly thereto, thereafter drawing the heated laminate to the desired shape, the vulcanized Butyl rubber sheet of the laminate serving to keep the polyethylene from rupturing during the drawing and maintaining the laminate in the drawn shape while cooling it to a form-sustaining temperature, the polyethylene sheet after said cooling serving to maintain the previously vulcanized Butyl rubber layer in the said desired shape.

3. The method of making a resin-lined collapsible container which comprises the steps of: providing a lamina of thermoplastic resin and at least a lamina of vulcanizable adhesive rubber composition, forming a laminate structure of said thermoplastic resin and rubber composition by bonding the lamina of thermoplastic resin to at least one lamina of the rubber composition; heat-curing said structure; cutting sections of desired size from said structure and heating said sections above the melting point of the resin; while hot, drawing said sections into two arcuate segments having the rubber lamina on the convex side by means of meeting members of a drawing form; placing said members face-to-face to form a juncture so that the resin lamina of each segment coalesces with that of the segment of said meeting member at the juncture into a continuous wall thus forming a closed liner of ellipsoidal shape; cooling the liner and removing said liner from the drawing form; placing a band of cured rubber, having an adhesive applied thereto, about the said liner at said juncture; low-pressurizing said liner; placing thereon in overlapping position a plurality of circular end pieces and truncated lune-shaped pieces of a fabric-reinforced uncured rubber to provide a protective outer covering; placing the resulting fabricated assembly in a mold; high-pressurizing said container; heat-curing said assembly and removing the assembly from said mold.

4. The method of making a resin-lined collapsible container which comprises the steps of: providing a layer of thermoplastic resin and a layer of vulcanizable adhesive rubber composition forming a laminate structure of said thermoplastic resin and rubber composition by bonding the layer of the thermoplastic resin to the layer of rubber composition; curing the laminate at a temperature above the melting point of said resin while hot, shaping the flat laminate into two arcuate segments having the rubber layer on the convex side; placing the segments in mating face-to-face relation to form a juncture so that the resin layers of each segment coalesce with each other at the juncture into a continuous wall thus forming a closed liner of ellipsoidal shape; cooling the liner; applying internal pressure within the liner; placing thereon in overlapping relation a plurality of pieces of vulcanizable rubberized fabric to provide a protective outer covering; enclosing the resulting fabricated assembly in a confining mold; and heat-curing said assembly in the mold while applying substantial internal fluid pressure within the assembly.

5. A method of making a flexible rubber container comprising providing a sheet of polyethylene and a sheet of vulcanizable Butyl rubber composition, preparing a flat laminate of the sheet of polyethylene and the sheet of vulcanizable Butyl rubber composition, heating the flat laminate above the melting temperature of said polyethylene in a press to vulcanize the Butyl rubber and to form a permanent adhesive bond between the polyethylene and the Butyl rubber, placing one such laminate across each face of two mold parts with the Butyl rubber layer facing toward the mold part and the polyethylene layer facing away from the mold part, each of said two mold parts having a planar parting face defining the peripheral edge of a concave cavity having the shape of one-half of an interior lining assembly of the container, clamping the outer edges of the laminate around the outer edges of such parting face to prevent relative movement between the laminate and the parting face, applying vacuum to each mold cavity while the laminates are in a heated, soft, plastic condition whereby the portion of the laminate bridging the mold cavity across the parting face of the mold is drawn inwardly into the cavity into conformity with the walls of the cavity, placing the two mold parts bearing such shaped laminates while still in a hot, plastic condition into mating engagement with the polyethylene layers of the laminates contacting each other in face-to-face relation between the parting faces of the mold parts, whereby the respective polyethylene layers of the laminates form a welded peripheral juncture and the polyethylene constitutes a complete envelope lining the entire inner container assembly, cooling the assembly while still contained within the two mating mold parts to render the polyethylene rigid enough to be form-sustaining, the said welded polyethylene juncture serving to permanently unite the two halves of the container assembly represented by each shaped laminate portion formed in each mold part, and the said polyethylene envelope serving to support in the desired shape of the container assembly the Butyl rubber layer previously vulcanized and adhered thereto in the form of a flat sheet, placing a band of cured rubber, having an adhesive applied thereto, about the said liner at the said juncture, subsequently applying to the outer vulcanized Butyl rubber surface of the container assembly at least one layer of vulcanizable Butyl rubberized fabric, and thereafter vulcanizing the assembly in the desired final shape.

6. A method of making a polyethylene-lined Butyl rubber flexible and collapsible container comprising providing a sheet of vulcanizable Butyl rubber reclaim composition and a sheet of polyethylene, laminating the sheet of vulcanizable Butyl rubber reclaim composition to the sheet of polyethylene, heating the laminate in the flat under pressure in a press at a temperature above the melting point of said polyethylene to cure the Butyl rubber layer and adhere it permanently to the polyethylene layer, shaping two such laminates at the softening temperature of said polyethylene in two matable mold parts each co-operating to define a mold cavity and representing halves of the container inner assembly with the polyethylene layer facing away from each mold part and with peripheral portions of the laminates extending over parting faces of the mold parts, pressing the two mold parts containing the shaped laminates together at elevated temperature in mating engagement with the polyethylene layer of each laminate at said peripheral portion in face-to-face engagement between the parting faces of the mold parts, whereby the polyethylene layers become welded together to form a peripheral juncture joining the two shaped container halves, cooling the assembly while still contained within the two mating mold parts to render the polyethylene rigid enough to be form sustaining, the said welded juncture serving to permanently unite the two halves of the container assembly represented by each shaped laminate portion formed in each mold part, and the formed polyethylene envelope serving to support in the desired shape of the container assembly the Butyl rubber layer previously vulcanized and adhered thereto in the form of a flat sheet placing a band of cured rubber, having an adhesive applied thereto, about the said juncture, applying to the outer vulcanized Butyl rubber reclaim surface of the thus-formed inner container assembly circular end pieces of textile cord fabric skim-coated with vulcanizable Butyl rubber composition and applying to the sides of the container a plurality of pieces of similar rubberized fabric in the form of truncated lunes with their end edges overlapping the circular end pieces and their lateral edges overlapping each other, disposing the thus-assembled container in a mold cavity having the finally desired shape of the container, and vulcanizing the container in said mold cavity while applying internal air pressure to the container.

References Cited in the file of this patent

UNITED STATES PATENTS

| | | |
|---|---|---|
| 1,919,366 | Haines | July 25, 1933 |
| 2,466,966 | Prance et al. | Apr. 12, 1949 |
| 2,483,234 | Roberts | Sept. 27, 1949 |
| 2,495,640 | Muskat | Jan. 24, 1950 |
| 2,509,882 | Roberts | May 30, 1950 |
| 2,588,807 | Bailey | July 3, 1951 |
| 2,648,487 | Linda | Aug. 11, 1953 |
| 2,653,818 | Tebbetts et al. | Sept. 29, 1953 |
| 2,705,691 | Panagrossi et al. | Apr. 5, 1955 |
| 2,711,985 | Olson | June 28, 1955 |

FOREIGN PATENTS

| | | |
|---|---|---|
| 713,262 | Great Britain | Aug. 11, 1954 |